(12) United States Patent
Pai et al.

(10) Patent No.: US 9,848,165 B2
(45) Date of Patent: Dec. 19, 2017

(54) PROTECTING PRIVACY OF A CUSTOMER AND AN AGENT USING FACE RECOGNITION IN A VIDEO CONTACT CENTER ENVIRONMENT

(71) Applicant: Avaya Inc., Basking Ridge, NJ (US)

(72) Inventors: Deep Subhash Pai, Pune (IN); Jaydeep Deepak Bhalerao, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/971,073

(22) Filed: Dec. 16, 2015

(65) Prior Publication Data

US 2016/0105638 A1 Apr. 14, 2016

Related U.S. Application Data

(63) Continuation of application No. 13/585,780, filed on Aug. 14, 2012, now Pat. No. 9,270,822.

(51) Int. Cl.
*H04N 7/14* (2006.01)
*H04M 3/51* (2006.01)
*G06K 9/00* (2006.01)

(52) U.S. Cl.
CPC ......... *H04N 7/147* (2013.01); *G06K 9/00221* (2013.01); *H04M 3/51* (2013.01); *H04M 3/5183* (2013.01); *G06K 9/00* (2013.01)

(58) Field of Classification Search
CPC combination set(s) only.
See application file for complete search history.

(56) References Cited

U.S. PATENT DOCUMENTS

| | | | |
|---|---|---|---|
| 7,564,476 B1 * | 7/2009 | Coughlan | H04N 7/147 348/14.01 |
| 9,270,822 B2 | 2/2016 | Pai et al. | |
| 2003/0053663 A1 | 3/2003 | Chen et al. | |
| 2004/0257431 A1 | 12/2004 | Girish et al. | |
| 2006/0105801 A1 * | 5/2006 | Cho | H04M 1/0245 455/550.1 |
| 2008/0136895 A1 | 6/2008 | Mareachen | |
| 2008/0297588 A1 | 12/2008 | Kurtz et al. | |
| 2009/0027485 A1 | 1/2009 | Erhart et al. | |
| 2009/0232129 A1 * | 9/2009 | Wong | H04M 7/0024 370/352 |

(Continued)

OTHER PUBLICATIONS

Nguyen, Phung Hoang Joseph; Office Action; U.S. Appl. No. 13/585,780; dated Mar. 6, 2015; United States Patent and Trademark Office, Alexandria, VA.

(Continued)

*Primary Examiner* — Joseph J Nguyen

(57) ABSTRACT

A method, apparatus and computer program product for protecting privacy of a customer and an agent using face recognition in a video contact center environment is presented. A video call is initiated by a customer to a contact center. The customer video is muted while audio of the customer is provided to an agent of the contact center. A determination is made regarding whether a face is present in a video image of the customer. When a presence of a face is determined in the video image of the customer, then video of the customer is enabled. When a presence of a face is not present in the video image of the customer then the customer is notified so the customer can take appropriate action.

12 Claims, 4 Drawing Sheets

(56) References Cited

U.S. PATENT DOCUMENTS

| | | | |
|---|---|---|---|
| 2010/0079508 A1* | 4/2010 | Hodge | G06F 3/013 |
| | | | 345/697 |
| 2010/0124363 A1 | 5/2010 | Ek et al. | |
| 2011/0141220 A1* | 6/2011 | Miura | H04L 12/40013 |
| | | | 348/14.02 |
| 2012/0131646 A1* | 5/2012 | Chandolu | G06F 21/6218 |
| | | | 726/4 |
| 2012/0154509 A1 | 6/2012 | Erb | |
| 2013/0027504 A1* | 1/2013 | Zhang | H04L 12/1827 |
| | | | 348/14.08 |
| 2013/0039483 A1* | 2/2013 | Wolfeld | H04M 3/00 |
| | | | 379/265.03 |

OTHER PUBLICATIONS

Nguyen, Phung Hoang Joseph; Final Office Action; U.S. Appl. No. 13/585,780; dated Aug. 21, 2015; United States Patent and Trademark Office, Alexandria, VA.

Nguyen, Phung Hoang Joseph; Notice of Allowance; U.S. Appl. No. 13/585,780; dated Nov. 10, 2015; United States Patent and Trademark Office, Alexandria, VA.

Nguyen, Phung Hoang Joseph; Corrected Notice of Allowance; U.S. Appl. No. 13/585,780; dated Nov. 24, 2015; United States Patent and Trademark Office, Alexandria, VA.

\* cited by examiner

PROTECTING PRIVACY OF A CUSTOMER AND AN AGENT USING FACE RECOGNITION IN A VIDEO CONTACT CENTER ENVIRONMENT

CROSS REFERENCE TO RELATED APPLICATIONS

The present application is a continuation of U.S. patent application Ser. No. 13/585,780, filed on Aug. 14, 2012, which is incorporated herein by reference in its entirety.

BACKGROUND

Contact centers are systems in which a person can communicate to receive information. Such communication can include, but is not limited to, telephone calls, Internet access, email, and FAX. A contact center can include one or more interactive voice response (IVR) systems. The one or more IVRs provide automatic branching voice queries to which the caller responds with button pushes on a telephone keypad or with voice responses on a telephone. The contact center may be provided having only the one or more IVR systems, or alternatively, it is also provided having human agents. For example, at the end of the IVR branching voice queries, the caller can be directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they correspond to distinct electronic systems and will be separately referred to herein The contact center can also include one or more database server computers, one or more database storage areas, one or more web server computers, and one or more email server computers. As described above, contact center actions include actions generated by agents within the contact center as well as actions by people outside of the contact center, for example telephone callers and web customers.

One type of contact center is referred to as a video contact center. Video contact centers allow a customer to interact with an agent using a video enabled device such as a camera on a mobile device or a web phone using a web camera attached to the customer's computer. The customer places a call into the contact center and where they will be served first by an automated Interactive Voice and Video System (IVVR) after which the customer will be added to a call/skill queue to wait for a certain period of time until an agent is available. With respect to agents, most contact centers are configured to auto-answer a call when the call lands at the agent's desktop. When a video call arrives at the agent, the system will automatically answer the call without any input from the agent.

SUMMARY

From a customer's perspective, while a customer is waiting for an agent to become available and handle the customer's call, the customer might get distracted with some other work and will be looking away from the screen. If at this time the call lands on the agent's desktop and is accepted by the agent, the agent would be able to see what the customer is doing or will be able to see the customer's environment without the knowledge of the customer, unintentionally violating the customer's privacy.

From an agent's perspective, between calls, if there is a long wait, the agent could easily be distracted, e.g. talking with colleagues, drinking water, or busy with other work such as replying to an email. If during this time a video call lands on the agent's desktop and is auto answered by the agent computer system, then the customer will be able to see the agent for a few seconds before the agent realizes that his video is being transmitted and agent's privacy is unintentionally violated. More important is the fact that the customer would expect to see a smiling face of an agent greeting him when the call is accepted rather than catching the agent unaware in a possibly awkward situation.

Conventional mechanisms to handle such situations wherein the privacy of a customer or agent may be unintentionally violated suffer from a variety of deficiencies. One conventional solution is to use a shutter to block the video from being captured. The use of a shutter requires manual action by the customer as they must remember to close the shutter before placing the call to the contact center and then manually open it up when they intend to send video. For an agent, the agent must remember to close the shutter before accepting the call and then manually open it up when they intend to send video.

Another conventional mechanism is to start the call with only the audio portion of the call enabled. In case of starting with an audio-only call the contact center has difficulty in routing the calls due to the fact that video is required and is not available at the start of the call which is important for finding the designated video agent. In case of the agent escalating the call to video, the agent will not be aware of the capabilities of the customer's endpoint and if it supports video and will cause customer interaction issues in a contact center environment. The customer would expect to see a smiling face of an agent greeting him when the call is accepted rather than a muted video screen.

Embodiments of the invention significantly overcome such deficiencies and provide mechanisms and techniques that protect the privacy of a customer and an agent using face recognition in a video contact center environment.

In a first particular embodiment of a method for protect the privacy of a customer and an agent using face recognition in a video contact center environment the method includes initiating, by a customer, a video call to a contact center. The method also includes muting video of the customer while providing audio of the customer to an agent of the contact center. The method further includes determining whether a face is present in a video image of the customer. When a presence of a face is determined in the video image of the customer, then video of the customer is enabled. When a presence of a face is not present in the video image of the customer then the customer is notified so the customer can take appropriate action. The appropriate may include, but is not limited to, manually starting the video or looking into the camera so that the presence of a face is recognized and the video of the customer can be enabled.

In another particular embodiment of a method for protect the privacy of an agent using face recognition in a video contact center environment, the method includes receiving, by an agent of a contact center, a video call from a customer. The method further includes automatically answering the call by a system of the agent, however the agent's audio and video are not connected to the customer so the customer will continue to wait for the agent. Additionally the method includes determining whether a face is present in a video image of the agent. When a presence of a face is determined in the video image of the agent, then audio & video of the agent is enabled. When a presence of a face is not present in the video image of the agent then the agent is notified so the agent can take appropriate action. The appropriate action may include, but is not limited to, manually starting the audio & video or looking into the camera so that the presence of a face is recognized and the audio & video of the agent can be enabled.

Other embodiments include a computer readable medium having computer readable code thereon for protecting the privacy of a customer and an agent using face recognition in a video contact center environment. The computer readable medium includes instructions for initiating, by a customer, a video call to a contact center. The computer readable medium also includes instructions for muting video of the customer and providing audio of the customer to an agent of the contact center. The computer readable medium further includes instructions for determining whether a face is present in a video image of the customer. The computer readable medium further includes instructions wherein when a presence of a face is determined in the video image of the customer, then video of the customer is enabled. The computer readable medium additionally includes instructions wherein when a presence of a face is not present in the video image of the customer then the customer is notified so the customer can take appropriate action. The appropriate may include, but is not limited to, manually starting the video or looking into the camera so that the presence of a face is recognized and the video of the customer can be enabled.

In another particular embodiment of a computer readable medium for protecting the privacy of a customer and an agent using face recognition in a video contact center environment the computer readable medium includes instructions for receiving, by an agent of a contact center, a video call form a customer. The computer readable medium further includes instructions for automatically answering the call by a system of the agent. Additionally the computer readable medium includes instructions for determining whether a face is present in a video image of the agent. The computer readable medium further includes instructions wherein when a presence of a face is determined in the video image of the agent, then video of the agent is enabled. The computer readable medium additionally includes instructions wherein when a presence of a face is not present in the video image of the agent then the agent is notified so the agent can take appropriate action. The appropriate may include, but is not limited to, manually starting the video or looking into the camera so that the presence of a face is recognized and the video of the agent can be enabled.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that protect the privacy of a customer and an agent using face recognition in a video contact center environment as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations that protect the privacy of a customer and an agent using face recognition in a video contact center environment as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
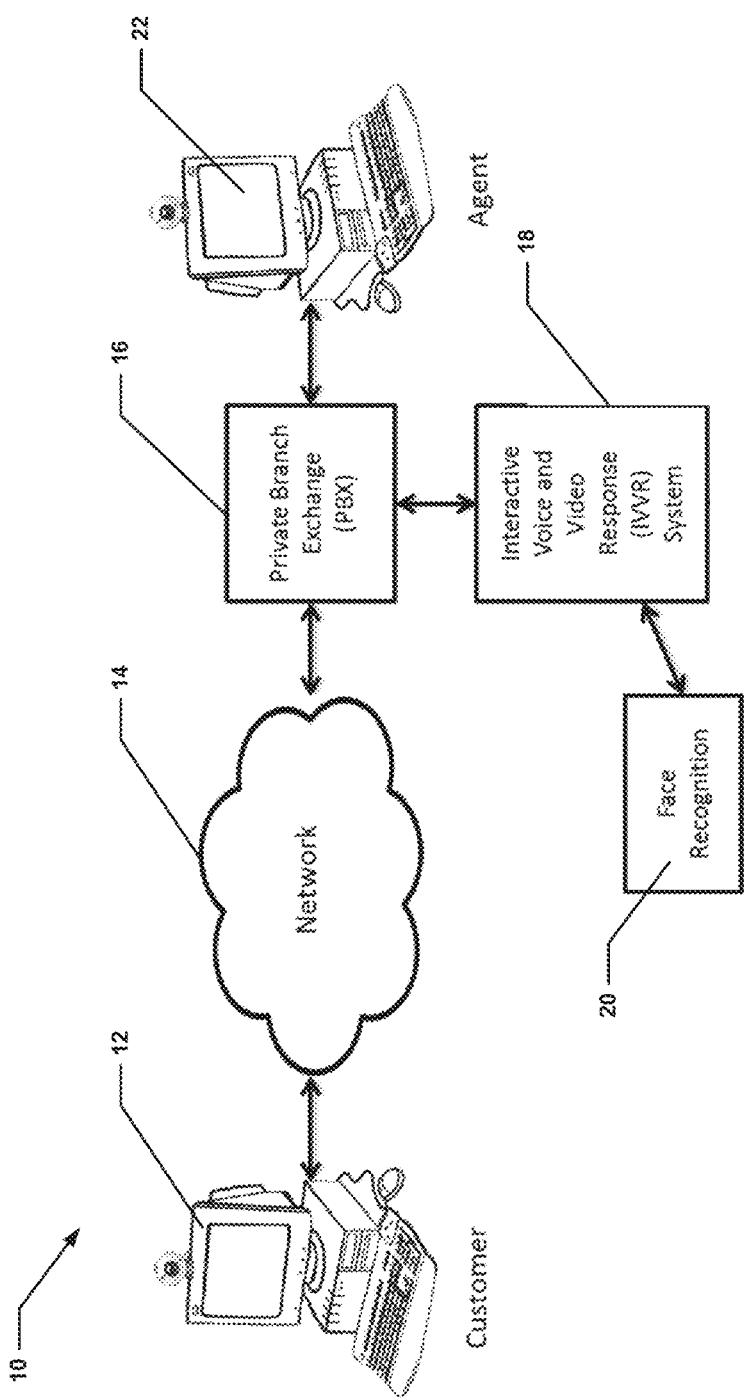
FIG. 1 depicts a block diagram of a system for protecting the privacy of a customer and an agent using face recognition in a video contact center environment in accordance with embodiments of the invention.
Figure 2:
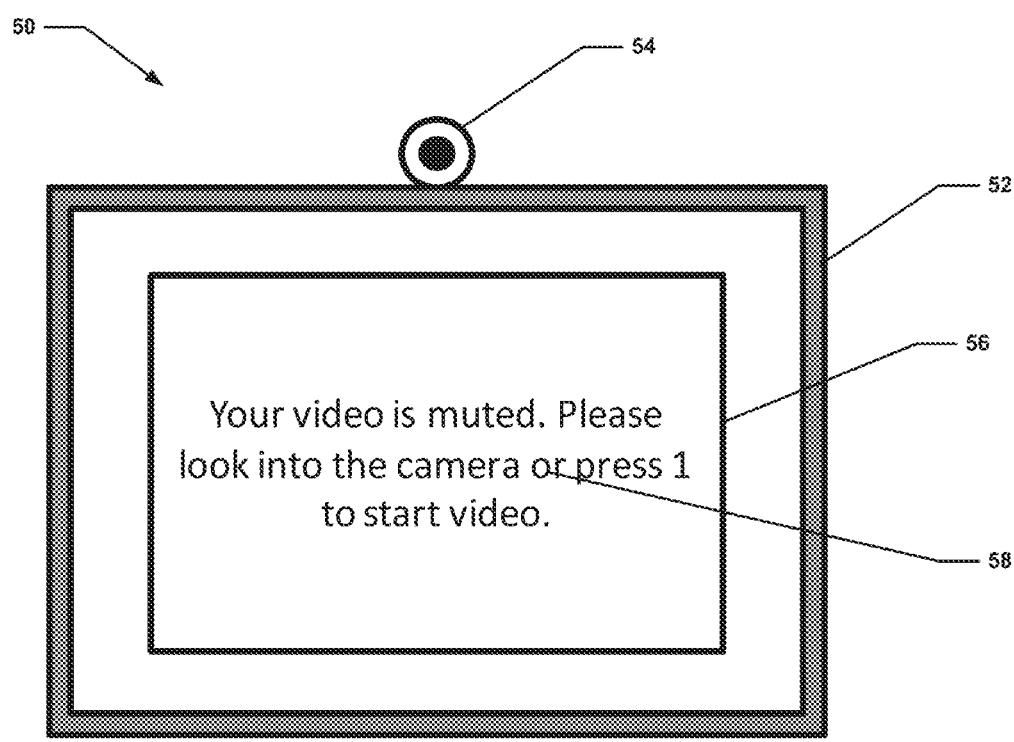
FIG. 2 depicts a block diagram of a customer/agent terminal in accordance with embodiments of the invention.

Referring to FIG. 1 and FIG. 2, a system 10 is shown that is useful for protecting the privacy of a customer and an agent using face recognition in a video contact center environment. System 10 includes a customer system 12 comprising a computer having a camera. While customer system 10 is shown as a desktop computer it should be appreciated that any type of computing device (including but not limited to a tablet, a smart phone, a laptop computer, and the like) could also be used.

Customer system 12 is in communication with a network 14. Network 14 may be a telephone network such as the PSTN which is a worldwide telephone system that provides telephone call connections, including telephone connections to a contact center 14. Alternately the network 14 can be a computer network such as the Internet.

A private branch exchange (PBX) 16 is shown in communication with the network 14. The PBX 16 comprises a sub-system that can route incoming telephone calls or communications to intended recipients, or agents. The PBX can be coupled to one or more interactive voice and video response systems (IVVRs) 18.

The IVVR 18 can, among the selections offered, request that the customer provide identifying information, for example an account number. Identifying information can also be automatically provided by the PBX 16 without entry by the customer by a variety of methods, including dialed number identification service (DNIS) and automatic number identification (ANI). The identifying information is coordinated with "customer data," for example account history associated with the customer. An application program can automatically provide a display of the caller data in a screen pop to the agent system 22.

The IVVR 18 is in communication with a face recognition element 20. Face recognition element 20 monitors video (of the customer and/or the agent) and determines whether a face is present in the video.

An agent computer system 22 is shown in communication with PBX 16. While agent system 22 is shown as a desktop computer it should be appreciated that any type of computing device (including but not limited to a tablet, a smart phone, a laptop computer, and the like) could also be used.

The presently described invention is for a system that will detect that the customer and/or agent is not ready to send video and provide mechanisms to protect the privacy of the agent and/or customer and an automatic method and an override for starting to send video.

In a first embodiment, a customer will initiate a video communication from customer system 12, through network 14 to PBX 16. The call will be presented to IVVR 18 and placed in a queue. When the agent at agent computer system 22 accepts the call, face recognition element 20 continuously monitors the video picture from the customer. The system 10 will use the face recognition element 20 to determine if the web camera of customer computer system 12 is facing the customer and further if the customer is looking in the general direction of the web camera. If the system 10 determines that the above two conditions are not met, then system 10 will not transmit video of the customer to the agent. The system will show a video picture using a text to video systems available in IVVRs that will notify the customer that his video is not being transmitted with instructions on how to start the video as shown in FIG. 2. An example of such a message "Your video is muted. Please look into the camera or press 1 to start video" 58, is displayed on the monitor 52 as an overlay text message in the remote video window 56. The customer at this point will realize that his call was answered as his audio with the agent would have started. The customer can then look into the camera or press a number on his keypad to start sending video to the agent. In such a manner the privacy of the customer placing the video call is protected.

On the agent side, the system 10 would behave in a slightly different manner. When the video call from the customer computer system 12 lands at the agent computer system 22, the call may be auto answered, and will not send audio and video to the customer computer system 12 directly. Instead the system 10 will first determine if the agent is ready to accept the video call, again using face recognition techniques and using eye tracking and gazing techniques to ensure that the agent is looking into the camera of agent computer system 22. Only when the system 10 determines that the agent is ready will the system 10 connect the audio and video call to the customer. If the system determines that the agent is not ready, it will show a similar message 58. The system will also use known methods to take necessary action such as altering the supervisor. In video contact centers, techniques such as hiding the camera behind a screen or using a beam splitter to ensure eye contact between an agent and a customer are performed, so it is a reasonable expectation to have the agent look into the camera to start a call.

Alternatively, the method mentioned above can be implemented directly in web based endpoints. Such endpoints that use HTML5 technologies that can capture camera for audio & video streaming using WebRTC APIs and do image processing and face detection on the video stream using Canvas tags and JavaScript (http://apprtc.appspot.com/html/face.html). In these types of endpoints, the JavaScript application can provide a physical button instead of DTMF to override the privacy protection.

Figure 3:
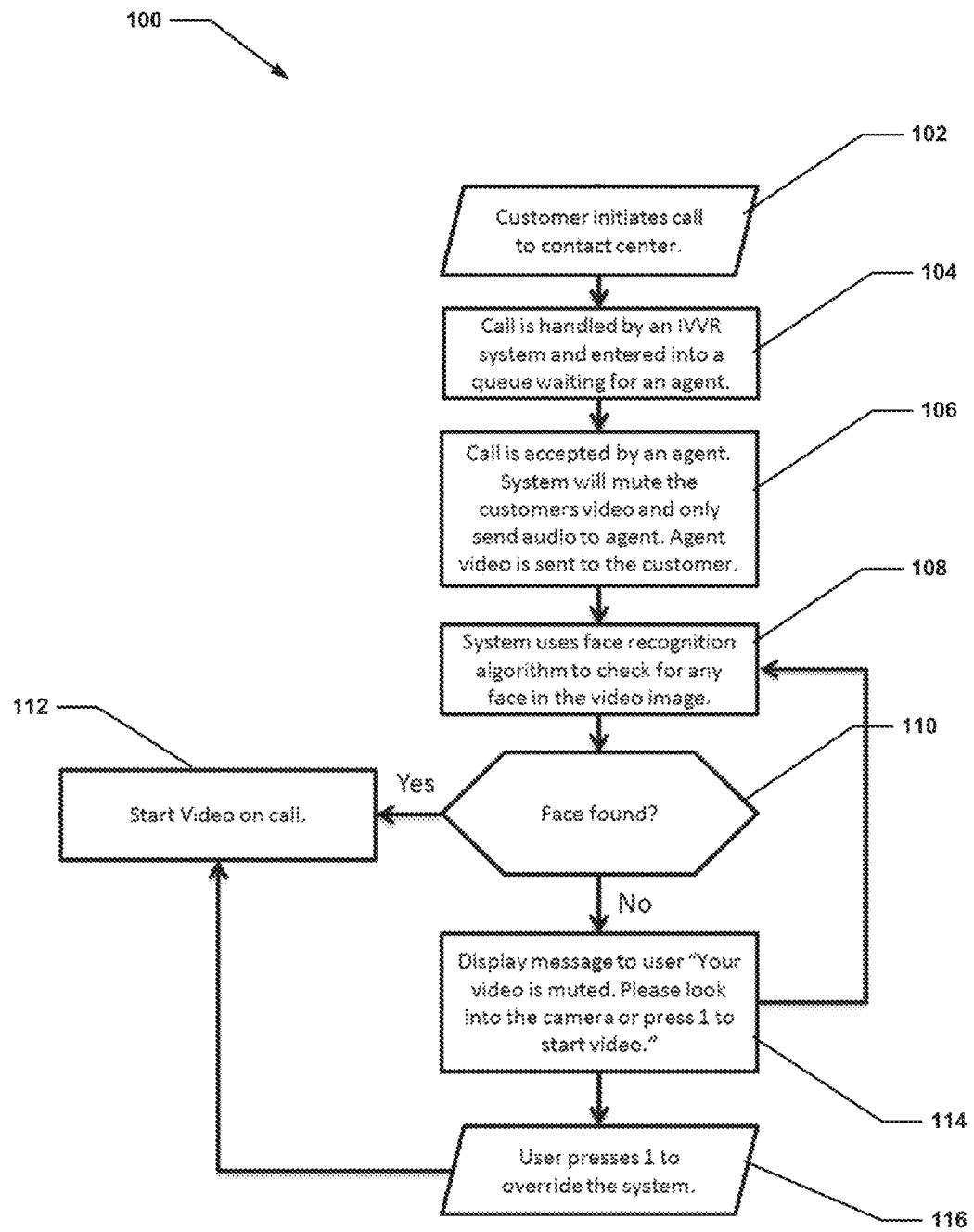
FIG. 3 depicts a flow diagram of a first particular embodiment of a method for protecting the privacy of a customer and an agent using face recognition in a video contact center environment in accordance with embodiments of the invention.
Figure 4:
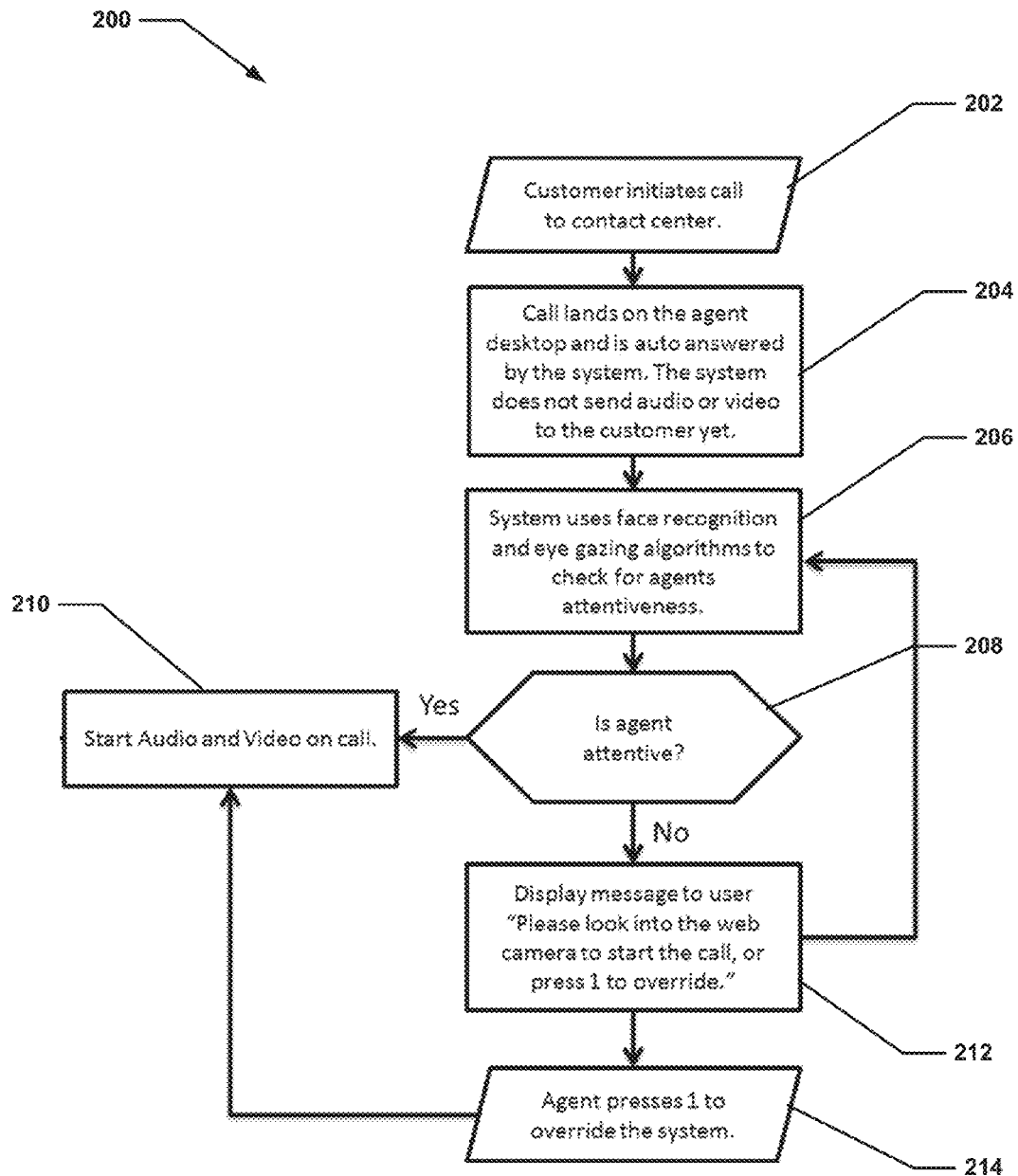
FIG. 4 depicts a flow diagram of a second particular embodiment of a method for protecting the privacy of a customer and an agent using face recognition in a video contact center environment in accordance with embodiments of the invention.

Flow diagrams of the presently disclosed methods are depicted in FIGS. 3 and 4. The rectangular elements are herein denoted "processing blocks" and represent computer software instructions or groups of instructions. The diamond shaped elements are herein denoted "decision blocks," and represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 for protecting the privacy of a customer and an agent using face recognition in a video contact center environment is shown. Method 100 begins with processing block 102 which discloses initiating, by a customer, a video call to a contact center. Contact centers are systems in which a person can communicate to receive information. One type of contact center is referred to as a video contact center. Video contact centers allow a customer to interact with an agent using a video enabled device such as a camera on a mobile device or a web phone using a web camera attached to the customer's computer.

Processing block 104 states the call is handled by an IVVR system and entered into a queue waiting for an agent. A contact center can include one or more IVVR systems. The one or more IVVRs provide automatic branching queries to which the caller responds. The customer places a call into the contact center and where they will be served first by an automated Interactive Voice and Video System (IVVR) after which the customer will be added to a call/skill queue to wait for a certain period of time until an agent is available.

Processing block 106 recites the call is accepted by an agent, and that the video of the customer is muted. At this point in the call, only the audio of the customer is to provided to the agent of the contact center. Video of the agent is sent to the customer. With respect to agents, most contact centers are configured to auto-answer a call when the call lands at the agent's desktop. When a video call arrives at the agent, the system will automatically answer the call without any input from the agent.

Processing block 108 discloses the system uses facial recognition to check for the presence of a face in the customer video. As shown in decision block 110, a determination is made regarding whether a face is present in a video image of the customer. When the presence of a face is detected, then processing proceeds with processing block 112, when the presence of a face is not found, processing continues with processing block 114.

When processing continues with processing block 112 from decision block 110, the customer video is provided on the call, allowing the agent to view the customer.

When processing continues with processing block 114 from decision block 110, the customer is notified that his or her video is muted and they need to take an action to start the video. As shown in processing block 116, the customer can manually start the video. Alternately, as shown in processing block 118, the customer can look into the camera so the facial recognition device can determine the presence of a face.

Referring now to FIG. 4, a second particular embodiment of a method 200 for protecting the privacy of a customer and an agent using face recognition in a video contact center environment is shown. Method 200 begins with processing block 202 which discloses initiating, by a customer, a video call to a contact center. Contact centers are systems in which a person can communicate to receive information. One type of contact center is referred to as a video contact center. Video contact centers allow a customer to interact with an agent using a video enabled device such as a camera on a mobile device or a web phone using a web camera attached to the customer's computer.

Processing block 204 states the call is sent to an agent and is auto answered by the agent system. The system does not send audio or video of the agent yet.

Processing block 206 discloses the system uses facial recognition (which may include eye gazing algorithms) to check for the attentiveness of an agent. When the agent is attentive (decision block 208), then processing proceeds with processing block 210 and when the agent is not attentive, processing continues with processing block 212.

When processing continues with processing block 210 from decision block 208, the agent audio and video is provided on the call, allowing the customer to hear and view the agent.

When processing continues with processing block 212 from decision block 208, the agent is notified that his or her audio and video are muted and they need to take an action to start the video. As shown in processing block 214, the agent can manually start the video. Alternately, as shown in processing block 216, the agent can look into the camera so the facial recognition device can determine the presence of a face.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. An interactive voice and video response system, comprising:
receiving, by an agent computer system of a contact center, a video call from a customer computer system;
automatically answering the video call by the agent computer system, the video call comprising a video stream and an audio stream generated by the agent computer system;
determining, by the agent computer system, whether a face of an agent associated with the agent computer system is present in the video stream;
delaying, by the agent computer system, connection of the video stream and the audio stream to the customer computer system when the face of the agent is determined to not be present in the video stream;
enabling, by the agent computer system, connection of the video stream and the audio stream to the customer computer system when the face of the agent is determined to be present in the video stream; and
notifying, by the agent computer system, the agent associated with the agent computer system when the face of the agent is determined to not be present in the video stream.

2. The method of claim 1 further comprising
receiving, by the agent computer system, input from the agent associated with the agent computer system to enable connection of the video stream and the audio stream to the customer computer system when the face of the agent is determined to not be present in the video stream.

3. The method of claim 1 wherein the audio stream comprises audio information received from the agent associated with the agent computer system and the video stream comprises video information received from the agent associated with the agent computer system.

4. The method of claim 1 wherein said determining whether the face of the agent associated with the agent computer system is present in the video stream comprises using facial recognition.

5. The method of claim 1 wherein said notifying the agent associated with the agent computer system when the face of the agent is determined to not be present in the video stream comprises providing a message on a display screen of the agent computer system.

6. A non-transitory computer-readable medium having instructions stored thereon that are executable by a computing device to perform operations comprising:
receiving a video call from a customer computer system;
automatically answering the video call, the video call comprising a video stream and an audio stream generated by the computing device;
determining whether a face of an agent associated with the computing device is present in the video stream;
delaying connection of the video stream and the audio stream to the customer computer system when the face of the agent is determined to not be present in the video stream;
enabling connection of the video stream and the audio stream to the customer computer system when the face of the agent is determined to be present in the video stream; and
notifying the agent associated with the computing device when the face of the agent is determined to not be present in the video stream.

7. The non-transitory computer-readable medium of claim 6 having instructions stored thereon that are executable by the computing device to perform operations comprising:
receiving input from the agent associated with the computing device to enable connection of the video stream and the audio stream to the customer computer system when the face of the agent is determined to not be present in the video stream.

8. The non-transitory computer-readable medium of claim 6 wherein the audio stream comprises audio information received from the agent associated with the computing device and the video stream comprises video information received from the agent associated with the computing device.

9. The non-transitory computer-readable medium of claim 6 wherein said determining whether the face of the agent associated with the computing device is present in the video stream comprises using facial recognition.

10. The non-transitory computer-readable medium of claim 6 wherein said notifying the agent associated with the computing device when the face of the agent is determined to not be present in the video stream comprises providing a message on a display screen of the computing device.

11. The method of claim 1 wherein determining whether the face of the agent is present in the video stream comprises determining whether the agent is looking into a camera associated with the agent computer system.

12. The non-transitory computer-readable medium of claim 6 wherein determining whether the face of the agent is present in the video stream comprises determining whether the agent is looking into a camera associated with the computing device.

\* \* \* \* \*